United States Patent
Becker et al.

[11] Patent Number: 5,364,174
[45] Date of Patent: Nov. 15, 1994

[54] ANTILOCKING SYSTEM

[75] Inventors: Rolf Becker, Ditzingen; Thomas Michel, Weil-der-Stadt; Manfred Meissner, Unterriexingen; Bernd Gutöhrlein, Stuttgart, all of Germany

[73] Assignee: Robert Bosch GmbH, Stuttgart, Germany

[21] Appl. No.: 927,638

[22] PCT Filed: Jan. 19, 1991

[86] PCT No.: PCT/EP91/00098
§ 371 Date: Sep. 4, 1992
§ 102(e) Date: Sep. 4, 1992

[87] PCT Pub. No.: WO91/14604
PCT Pub. Date: Oct. 3, 1991

[30] Foreign Application Priority Data

Mar. 22, 1990 [DE] Germany ............... 4009195

[51] Int. Cl.⁵ .................................... B60T 8/66
[52] U.S. Cl. .............................. 303/97; 303/111; 364/426.02
[58] Field of Search ............ 303/97, 103, 108, 111; 364/426.02, 426.03

[56] References Cited

U.S. PATENT DOCUMENTS

| | | | |
|---|---|---|---|
| 3,950,036 | 4/1976 | Fink et al. | 303/111 |
| 4,037,882 | 7/1977 | Taylor | 303/97 X |
| 4,321,676 | 3/1982 | Ohmori et al. | 303/97 X |
| 4,702,337 | 10/1987 | Burckhardt et al. | 180/197 |
| 4,717,209 | 1/1988 | Hagiya et al. | 303/111 |
| 4,745,987 | 5/1988 | Buschmann | 180/197 |
| 4,760,893 | 8/1988 | Sial et al. | 180/197 |
| 4,773,714 | 9/1988 | Shimanuki et al. | 303/108 |
| 5,015,042 | 5/1991 | Yoshino | 303/96 |
| 5,184,876 | 2/1993 | Beyer et al. | 303/96 X |

FOREIGN PATENT DOCUMENTS

| | | |
|---|---|---|
| 0322911 | 7/1989 | European Pat. Off. . |
| 0331131 | 9/1989 | European Pat. Off. . |
| 3426747A1 | 1/1986 | Germany . |
| 2254295C2 | 6/1987 | Germany . |
| 3644259 | 7/1987 | Germany . |
| 3536185C2 | 6/1988 | Germany . |
| 3706514 | 9/1988 | Germany . |
| 3841957A1 | 6/1990 | Germany . |
| 2151320 | 7/1985 | United Kingdom . |

*Primary Examiner*—Robert J. Oberleitner
*Assistant Examiner*—Alfred Muratori
*Attorney, Agent, or Firm*—Spencer, Frank & Schneider

[57] ABSTRACT

Described is an ABS for vehicles in which all wheels are driven. Of particular concern is the forming of a final reference speed for the slip control. From the speeds of wheels with different speeds, an auxiliary reference speed, and a reference speed and a final reference speed for the slip control is formed. In the event of instability, however, the increase of the auxiliary reference speed determines the reference speed.

9 Claims, 4 Drawing Sheets

ANTILOCKING SYSTEM

BACKGROUND OF THE INVENTION

From DE-A1 3706 514, a method is known to determine, in a vehicle with a two-wheel drive, the reference speed for the development of a slip signal, other than by the control, through the speed of the slower of the non-driven wheels. In the event of instability, the increase of an auxiliary reference speed, which is determined, other than by the control, through the speed of the faster of the non-driven wheels, determines the reference speed.

SUMMARY OF THE INVENTION

The object of the invention is to develop a method which determines a final reference speed signal for development of a slip signal, as described above, for all-wheel drive vehicles rather than two wheel drive vehicles.

This object is achieved, according to one embodiment of the invention, in an improved method for obtaining a final reference speed signal in an anti-lock brake system having a slip control facility, for which a reference speed signal and an auxiliary reference speed signal having a time domain slope which determines characteristics of the reference speed signal in the case of instability of at least one wheel, are derived from wheel speed signals produced by a wheel sensor means for measuring the speed of a fastest, second-fastest, third-fastest, and slowest wheel, respectively, wherein when used on a vehicle with four driven wheels, the auxiliary reference speed signal is increased with the speed signal of the third-fastest wheel and decreased with the speed signal of the fastest wheel and in that, between the end of the increase and the beginning of the decrease, the auxiliary reference speed signal is held at the last speed signal value attained during the increase, and in that the reference speed signal is increased with the speed signal of the slowest wheel and decreased with the speed signal of the third-fastest wheel and in that, between the end of the increase and the beginning of the decrease, the reference speed signal is held at the last speed signal value attained during the increase and wherein the final reference speed signal corresponds to the reference speed signal.

The object is achieved, according to a further embodiment of the invention, in an improved method for obtaining a final reference speed signal in an anti-lock brake system having a slip control facility, for which a reference speed signal and an auxiliary reference speed signal having a time domain slope which determines characteristics of the reference speed signal in a case of instability of at least one wheel, are derived from wheel speed signals produced by a wheel sensor means for measuring the speed of a fastest, second-fastest, third-fastest, and slowest wheel, respectively, wherein when used on a vehicle with four driven wheels but with a rear axle decoupled from a drive during braking, the auxiliary reference speed signal is increased with the speed signal of the third-fastest wheel and decreased with the speed signal of the fastest wheel and in that, between the end of the increase and the beginning of the decrease, the auxiliary reference speed signal is held at the last speed signal value attained during the increase, and in that the reference speed signal is increased with the speed signal of the slowest wheel and decreased with the speed signal of the slowest of the wheels decoupled from the drive until a predetermined speed difference occurs between the reference speed signal and the auxiliary reference speed signal and in that the reference speed signal is then maintained parallel to the auxiliary reference speed signal at a difference corresponding to the predetermined speed difference and wherein the final reference speed signal corresponds to the reference speed signal.

All wheels are now included in forming the reference. The slip caused by the wheel speed differences during cornering is thus successfully eliminated. This slip would otherwise lead to a sensitive start of control.

The linking of the reference speed, according to another embodiment of the invention, to a faster rotating wheel, in particular the fastest turning wheel or to the auxiliary reference speed has the effect that too low a reference speed is avoided.

According to a further embodiment of the invention, an undesirable increase of the reference speed is prevented by holding the reference speed constant when the wheels are spinning. The increase of the auxiliary reference speed can also be used as vehicle retardation during the control action.

BRIEF DESCRIPTION OF THE DRAWINGS

Embodiments of the invention are explained by means of the following drawings.

DETAILED DESCRIPTION OF THE PREFERRED EMBODIMENTS

Figure 1:
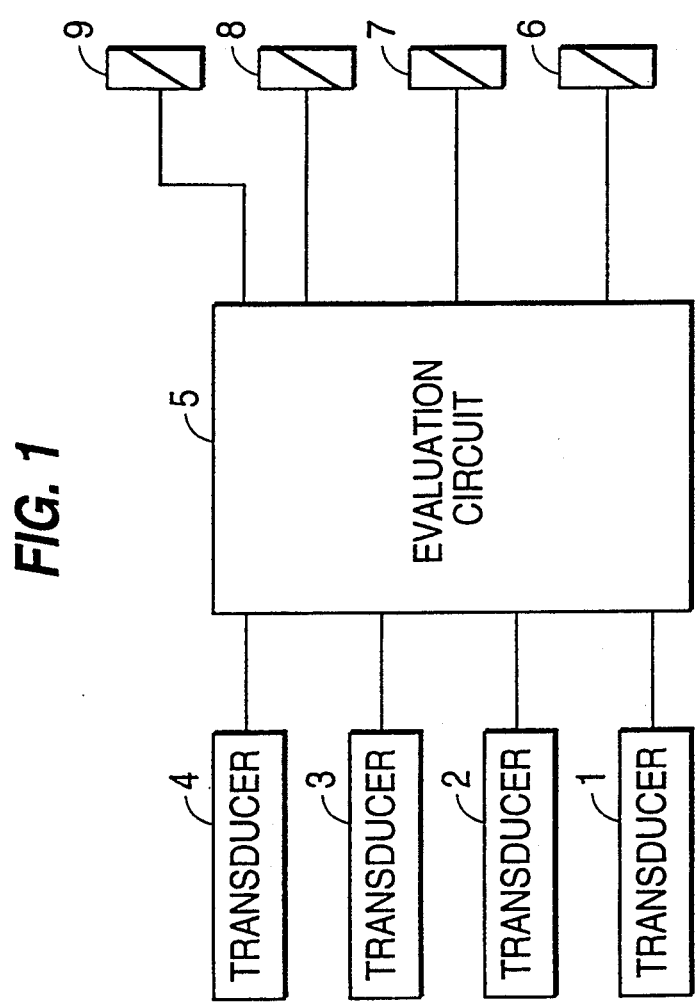
FIG. 1 is a block diagram of an antilocking controller.

FIG. 1 shows the components of an antilocking control system. Transducers 1-4 are assigned to the four vehicle wheels for the determination of the wheel speeds.

An evaluation circuit 5, to which the speed signals from transducers 1-4 are fed, is connected to four solenoid valves 6-9 which are driven by brake pressure control signals produced in evaluation circuit 5.

In evaluation circuit 5, slip signals $S_1$-$S_4$ are generated in addition to other signals. Slip signals $S_1$-$S_4$ are used in the control logic contained in evaluation circuit 5 during the development of control signals for valves 6-9. Slip signals $S_1$-$S_4$ are obtained from the speed signals $V_1$-$V_4$ of the transducers 1-4 which are assigned to these wheels. The speed signals are numbered in descending order of wheel speed with $V_1$ being the fastest wheel speed and $V_4$ being the slowest wheel speed.

Figure 2:
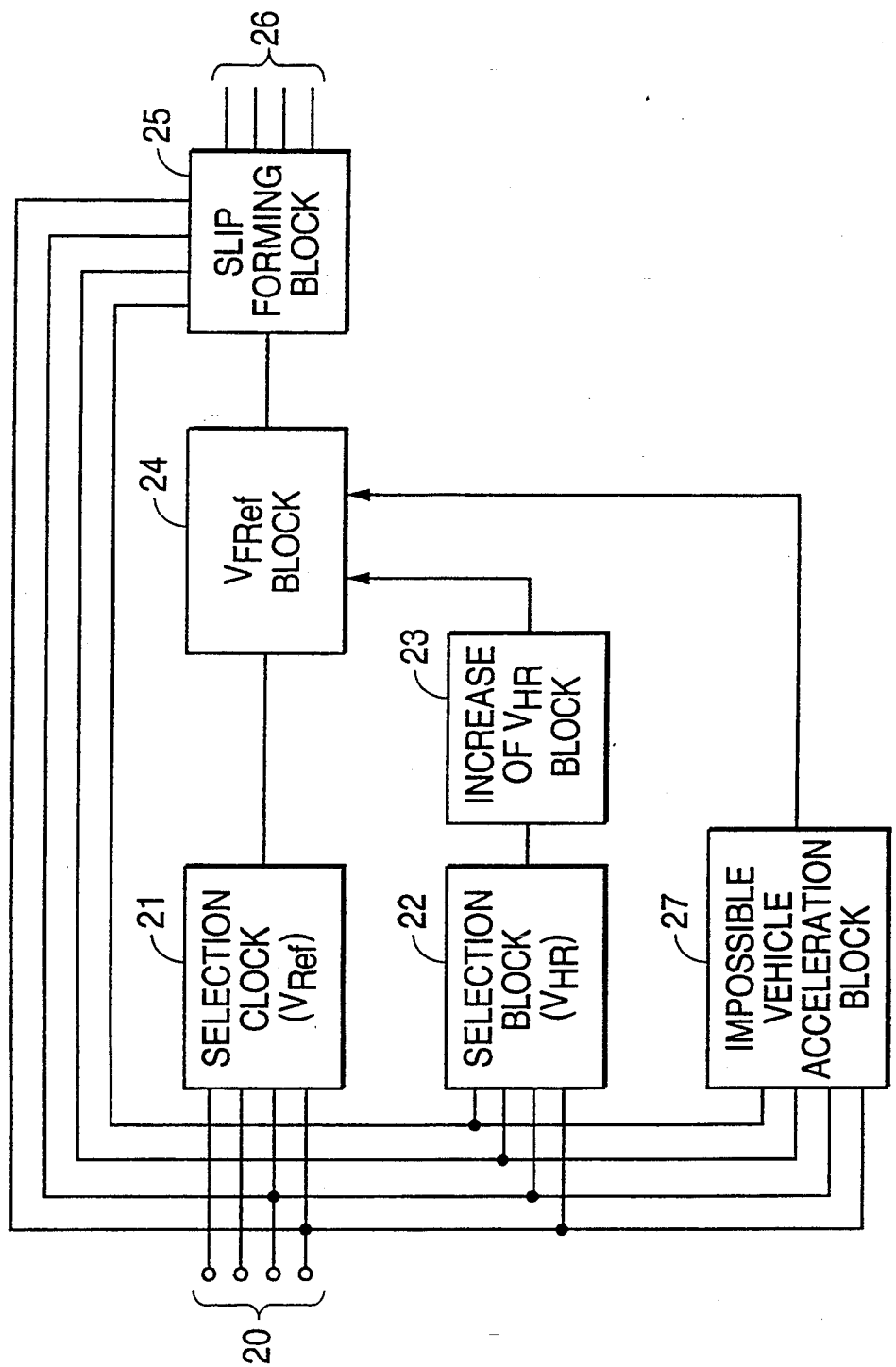
FIG. 2 is a block diagram of the evaluation circuit of FIG. 1 with the development of the reference speed signal, the auxiliary reference speed signal, and the slip signal in accordance with the invention.

A possible circuit for the slip development is shown in FIG. 2.

The four wheel speed signals $V_1$–$V_4$ of the all-wheel driven vehicle are fed via terminals 20, as shown in FIG. 2, to blocks 21, 22, 25 and 27. Blocks 21 and 22 are selection blocks. With rising speed, block 21 selects the speed signal $V_4$ of the slowest wheel and outputs this signal as a reference speed signal (see FIG. 3, dotted curve is reference speed signal $V_{Ref}$).

Figure 3:
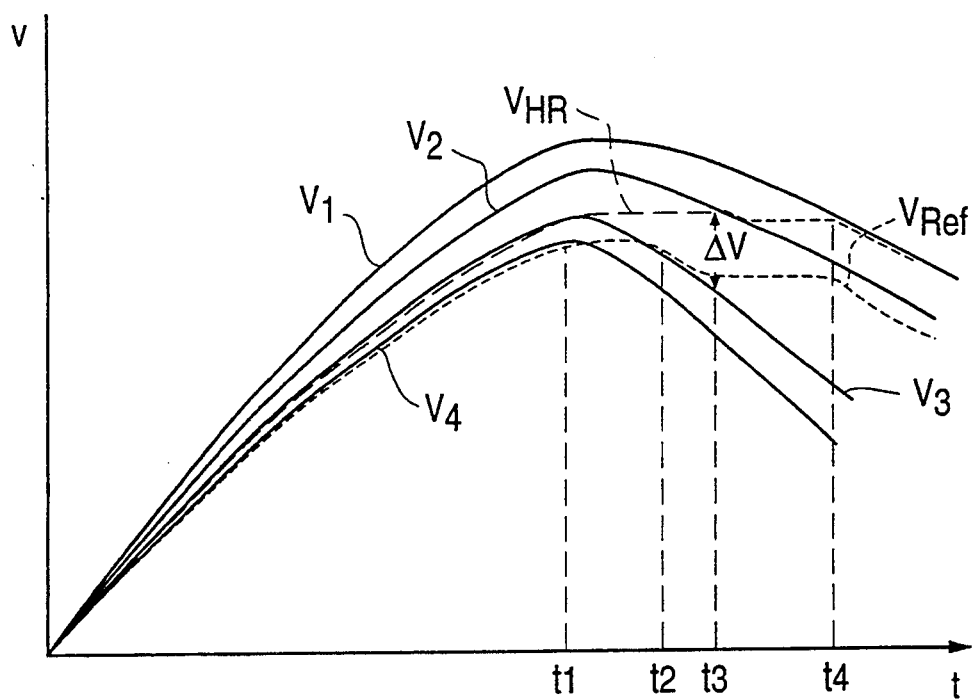
FIG. 3 is a graph of velocity versus time showing values of reference speed and auxiliary reference speed produced for wheel speeds $V_1$-$V_4$ according to an embodiment of the invention.

As shown in FIG. 3, if the wheel speed signal $V_4$ of the slowest wheel is not increasing, as from $t_1$, then the reference speed signal $V_{Ref}$ retains the maximum speed value of $V_4$, until at $t_2$ the speed signal $V_3$ of the third fastest wheel is the same as the retained maximum speed value of $V_4$. From $t_2$, the reference speed signal $V_{Ref}$ follows the speed signal $V_3$ of the third fastest wheel, until at $t_3$, the difference $\Delta V$ between speed signal $V_3$ and auxiliary reference speed signal $V_{HR}$ (shown as a dashed line in FIG. 3) reaches a predetermined value and the reference speed signal $V_{Ref}$ follows the auxiliary reference speed signal $V_{HR}$ minus the difference $\Delta V$.

Auxiliary reference speed signal $V_{HR}$ is formed in block 22 by selecting the third fastest wheel speed signal $V_3$ during acceleration, then retaining from $t_1$ onward the maximum speed value of $V_3$, until at $t_4$ the speed signal of the fastest wheel $V_1$ is the same as the maximum speed value of $V_3$ and thereafter following the fastest wheel speed signal $V_1$.

The selection block 21 transmits reference speed signal $V_{Ref}$ to block 24. The selection block 22 transmits auxiliary reference speed signal $V_{HR}$ to block 23 which determines the increase of this signal and supplies the increase value to block 24. In the case of instability, i.e. during a sudden drop of the speed signal supplied to block 21 due to a locking tendency, the increase of the auxiliary reference speed signal $V_{HR}$ determines the increase of the reference speed signal $V_{Ref}$ when the decrease of the reference speed signal $V_{Ref}$ exceeds the decrease of the auxiliary reference speed signal $V_{HR}$.

Figure 4:
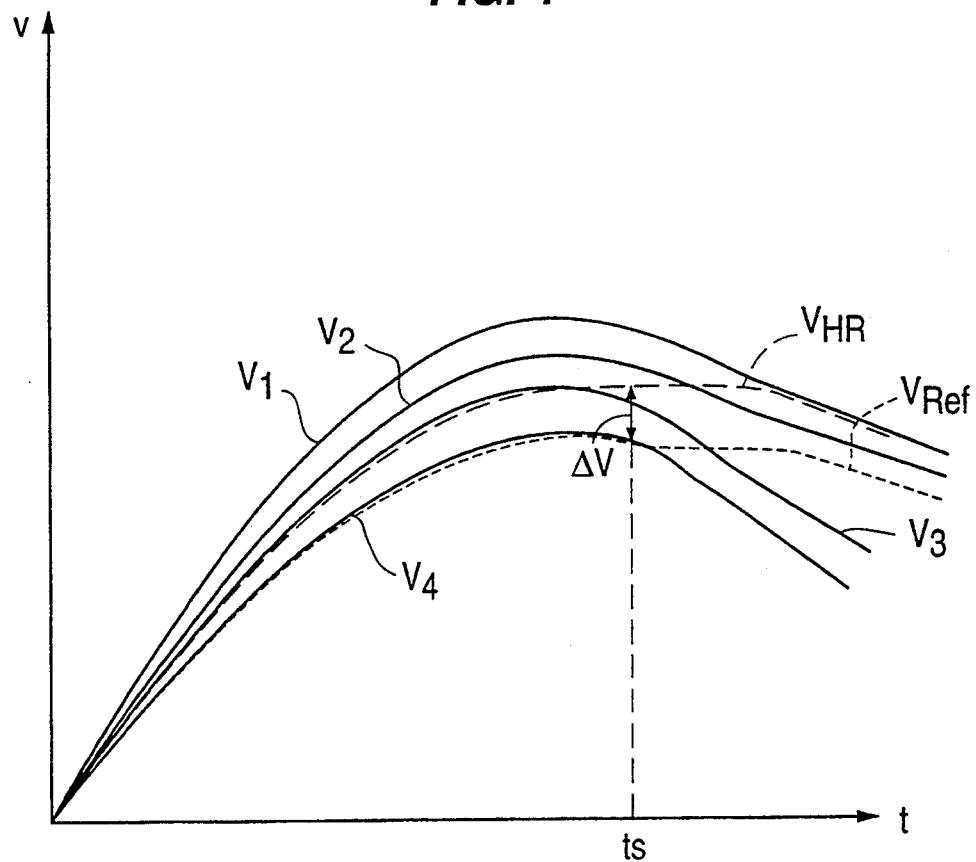
FIG. 4 is a graph of velocity versus time showing values of reference speed and auxiliary reference speed produced for wheel speeds $V_1$-$V_4$ according to an embodiment of the invention, for the case where the rear wheels are decoupled during braking.

As shown in FIG. 4, for the case where the rear wheels of a vehicle with all-wheel drive are decoupled from the drive during braking, the reference speed signal $V_{Ref}$ in block 21 is equal to the wheel speed signal $V_4$ of the slowest wheel during increasing speed, and during decreasing speed (until $t_5$ in FIG. 4). At time $t_5$, the difference $\Delta V$ between the auxiliary reference speed signal $V_{HR}$ and the wheel speed signal $V_4$ reaches a predetermined value. Subsequently, the reference speed signal $V_{Ref}$ follows the auxiliary reference speed signal $V_{HR}$ minus the difference $\Delta V$. This auxiliary reference speed signal $V_{HR}$ is formed as described above in reference to FIG. 3.

In both cases (as illustrated in FIGS. 3 and 4), a final reference speed signal $V_{FRef}$ formed in block 24 (with the increase of the auxiliary reference speed signal $V_{HR}$ in the event of instability) is supplied to block 25 for the purpose of forming slip signals on lines 26.

Figure 5:
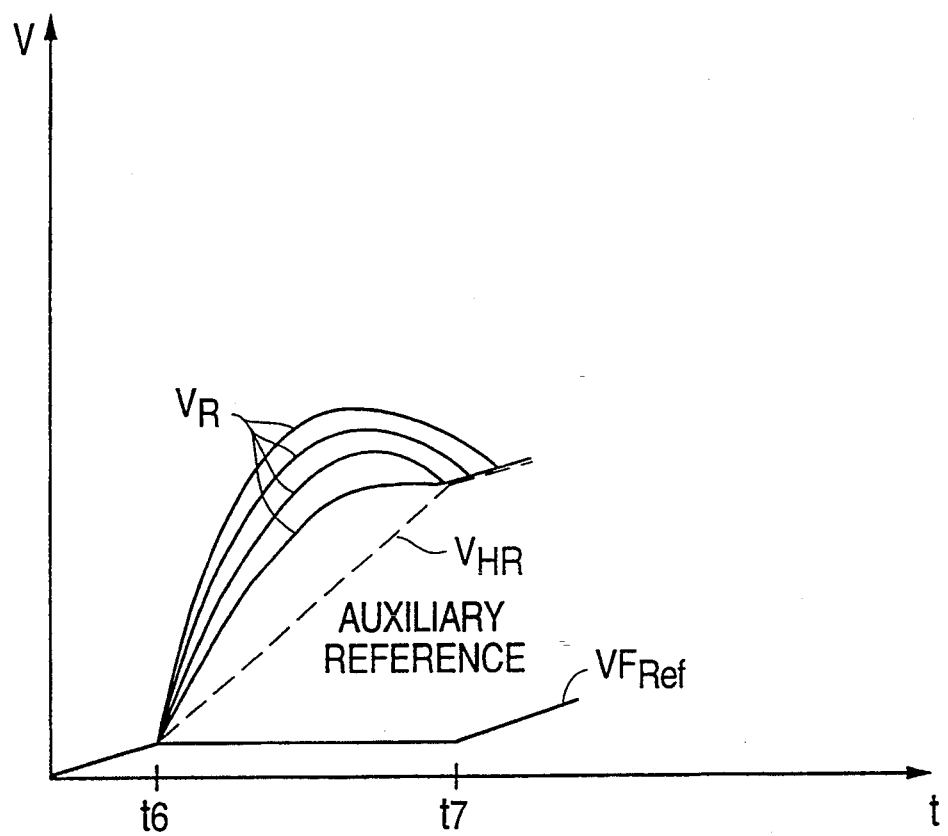
FIG. 5 is a graph of velocity versus time showing values of reference speed and auxiliary reference speed produced for wheel speeds $V_1$-$V_4$ according to an embodiment of the invention, for the case where the wheel speeds adopt physically impossible acceleration values.

In block 27, it is ascertained whether the wheel speeds adopt physically impossible vehicle acceleration values. If this is the case, wheel spin is recognized and a command is sent to block 24 which then holds the final reference speed signal $V_{FRef}$ constant. This is shown in FIG. 5, in which the wheels spin from $t_6$ to $t_7$. During this spinning phase ($t_6$ to $t_7$), the final reference speed signal $V_{FRef}$ is held constant. At $t_7$, spinning is no longer recognized. In the spinning phase ($t_6$ to $t_7$), the rise of the auxiliary reference speed signal $V_{HR}$ is limited in block 23 to the physically possible vehicle acceleration. At $t_7$, the auxiliary reference speed signal $V_{HR}$ follows the third fastest wheel speed signal $V_3$.

The following applies outside of the control action.

In each computing cycle, the retardation reference is compared with the wheel speeds. If all of the wheel speeds are smaller than the retardation reference (as a rule, therefore, only during vehicle retardation), then the retardation reference is decreased. If one or two wheel speeds are greater than the retardation reference, the retardation reference remains unchanged. If three or four wheel speeds are higher than the retardation reference, then the retardation reference is increased.

A special case arises if more than one wheel is on V-Min. Each of these wheels (except for the first) is treated as if it were above the reference speed. This eliminates the risk of a speed sensor break on two wheels causing an unrecognized ABS failure.

Accordingly, the FZ-REF is increased when all wheel speeds are above it. If two or three wheel speeds are above FZ-REF, Ft-REF is held constant. If none or only one of the wheels speeds is above FZ-REF, FZ-REF is decreased.

Upward matching will not take place when all wheels are recognized to be spinning. This is the case when all wheel speeds are above V-REF, where V-REF has been increased to the maximum value of 0.7 g. (With the vehicles concerned, accelerations of more than 0.7 g are not possible, which is why such driving conditions lead to the conclusion that all wheels are spinning). For this period, FZ-REF is held constant.

We claim:

1. In a method for controlling brake pressure in a vehicle anti-lock brake system having a slip control facility, said method including: deriving a reference speed signal and an auxiliary reference speed signal, having a time domain slope which determines characteristics of the reference speed signal in a case of instability of at least one wheel, from wheel speed signals produced by a wheel sensor means for measuring the speed of a fastest, second-fastest, third-fastest, and slowest wheel, respectively; varying the course of the reference speed signal according to the time domain slope of the auxiliary speed signal in the case of instability of at least one of the vehicle wheels; forming respective slip signals for the vehicle wheels from the reference speed signal and respective measured wheel speed signals; and using the slip signals to control the brake pressure at the vehicle wheels; the improvement wherein, when used on a vehicle with four driven wheels, said step of deriving includes: increasing the auxiliary reference speed with the speed signal of the third-fastest wheel, decreasing the auxiliary reference speed signal with the speed signal of the fastest wheel, and between the end of the increase and the beginning of the decrease, holding the auxiliary reference speed signal at the last speed signal value attained during the increase; and, increasing the reference speed signal with the speed signal of the slowest wheel, decreasing the reference speed signal with the speed signal of the third-fastest wheel, and between the end of the increase and the beginning of the decrease, holding the reference speed signal at the last speed signal value attained during the increase.

2. A method according to claim 1, wherein said step of varying includes, after reaching a predetermined speed difference relative to the auxiliary reference speed signal, reducing the reference speed signal parallel to the auxiliary reference speed signal at a difference corresponding to the predetermined speed difference.

3. A method according to claim 2, further comprising determining whether the vehicle wheels are spinning, and maintaining the final reference speed signal is held constant if the wheels are spinning.

4. A method according to claim 3, wherein the wheels are characterized as spinning if all the wheels have a higher wheel acceleration than a physically possible vehicle acceleration.

5. A method according to claim 1, further comprising determining whether the vehicle wheels are spinning, and maintaining the final reference speed signal constant if the vehicle wheels are determined to be spinning.

6. A method according to claim 5, wherein the wheels are characterized as spinning if all the wheels have a higher wheel acceleration than a physically possible vehicle acceleration.

7. In a method for controlling brake pressure in an anti-lock brake system having a slip control facility, said method comprising: deriving a reference speed signal and an auxiliary reference speed signal, having a time domain slope which determines characteristics of the reference speed signal in a case of instability of at least one wheel, from wheel speed signals produced by a wheel sensor means for measuring the speed of a fastest, second-fastest, third-fastest, and slowest wheel, respectively; varying the course of the reference speed signal according to the time domain slope of the auxiliary speed signal in the case of instability of at least one of the vehicle wheels; forming respective slip signals for the vehicle wheels from the reference speed signal and respective measured wheel speed signals; and using the slip signals to control the brake pressure at the vehicle wheels; the improvement wherein, when used on a vehicle with four driven wheels but with a rear axle decoupled from a drive during braking, said step of deriving includes: increasing the auxiliary reference speed signal with the speed signal of the third-fastest wheel, decreasing the auxiliary reference speed signal with the speed signal of the fastest wheel and, between the end of the increase and the beginning of the decrease, holding the auxiliary reference speed signal at the last speed signal value attained during the increase; and, increasing the reference speed signal with the speed signal of the slowest wheel, decreasing the reference speed signal with the speed signal of the slowest of the wheels decoupled from the drive until a predetermined speed difference occurs between the reference speed signal and the auxiliary reference speed signal, and then maintaining the reference speed signal parallel to the auxiliary reference speed signal at a difference corresponding to the predetermined speed difference wherein the final reference speed signal corresponds to the reference speed signal.

8. A method according to claim 7, further comprising determining whether the vehicle wheels are spinning, and maintaining the final reference speed signal constant if the wheels are spinning.

9. A method according to claim 8, wherein the wheels are characterized as spinning if all the wheels have a higher wheel acceleration than a physically possible vehicle acceleration.

* * * * *